(12) United States Patent
Tatewaki (10) Patent No.: US 7,841,782 B2
(45) Date of Patent: Nov. 30, 2010

(54) DOME TYPE CAMERA WITH INDEPENDENTLY ROTATABLE AND LOCKABLE COVER

(75) Inventor: Toshikazu Tatewaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/064,262

(22) PCT Filed: Oct. 3, 2006

(86) PCT No.: PCT/JP2006/319787

§ 371 (c)(1),
(2), (4) Date: Feb. 20, 2008

(87) PCT Pub. No.: WO2007/043396

PCT Pub. Date: Apr. 19, 2007

(65) Prior Publication Data

US 2009/0162048 A1 Jun. 25, 2009

(30) Foreign Application Priority Data

Oct. 14, 2005 (JP) .............................. 2005-299878

(51) Int. Cl.
*G03B 17/00* (2006.01)
*H04N 7/18* (2006.01)
(52) U.S. Cl. ...................... 396/427; 396/428; 348/143; 348/373
(58) Field of Classification Search .................. 396/427
See application file for complete search history.

(56) References Cited

U.S. PATENT DOCUMENTS 4,920,367 A * 4/1990 Pagano ....................... 396/427

6,268,882 B1 * 7/2001 Elberbaum .................. 348/151
6,357,936 B1 * 3/2002 Elberbaum .................. 396/427
7,217,045 B2 * 5/2007 Jones ......................... 396/427

FOREIGN PATENT DOCUMENTS

EP    1 113 408 A1   7/2001
GB    2 421 869 A    7/2006

(Continued)

OTHER PUBLICATIONS

Machine English translation of JP 2001-174902, Jun. 29, 2001, David Erubabaumu, G03B 17/56, 24 pages.*
International Search Report for PCT/JP2006/319787.
British Office action dated May 20, 2010.

*Primary Examiner*—W. B. Perkey
*Assistant Examiner*—Bret Adams
(74) *Attorney, Agent, or Firm*—Pearne & Gordon LLP (57) ABSTRACT

A dome type camera (1) comprises a camera (2), a lower case (3) having a first serration (9), an upper case (4), a dome cover (6), and an inner cover (7) having a second serration (20), where the upper case (4) can be attached to the lower case (3) at two steps of attachment positions which are an adjustment position and a locking position. When the attachment position of the upper case (4) is set at the adjustment position, the first serration (9) and the second serration (20) are incompletely engaged with each other, allowing the inner cover (7) to be rotatable with respect to the lower case (3), and when the attachment position of the upper case (4) is set at the locking position, the first serration (9) and the second serration (20) are completely engaged with each other, allowing the inner cover (7) to be fixed to the lower case (3). The orientation of the cover can be easily adjusted after the cover has been attached, and the work efficiency is improved in installation and adjustment works.

6 Claims, 3 Drawing Sheets

FOREIGN PATENT DOCUMENTS

| | | |
|---|---|---|
| JP | 2001-174902 | 6/2001 |
| JP | 2003-527758 | 9/2003 |
| JP | 2004-356669 | 12/2004 |
| WO | 00/04720 | 2/2000 |

* cited by examiner

DOME TYPE CAMERA WITH INDEPENDENTLY ROTATABLE AND LOCKABLE COVER

TECHNICAL FIELD

The present invention relates to a dome type camera in which the work efficiency is improved in installation and adjustment works.

BACKGROUND ART

A dome type camera is, for example, used for surveillance of a facility and installed on a wall, ceiling, or the like of a facility. Such a dome type camera has a camera for shooting in a prescribed shooting direction, a chassis (case) to be attached with the camera, and a dome type cover for covering the camera attached to the chassis. The cover of the dome type camera is provided with a window where the cover is cut corresponding to the angle of view of the camera so that the field of view of the camera in a shooting direction may be maintained and other parts may be protected so as not to be seen from the outside. For this reason, when such a dome type camera is installed on a ceiling, wall, or the like of a facility, an adjustment work is required which matches the shooting direction of the camera and the orientation of the window of the cover.

Conventionally, a dome type camera is known in which each of the chassis and the cover has a scale marked thereon that corresponds to each other. In the conventional dome type camera, when it is installed on a ceiling, wall, or the like of a facility, the shooting direction of the camera and the orientation of the window of the cover are matched by aligning the scales of the chassis and cover with each other. Such a dome type camera is disclosed, for example, in Japanese Patent Laid-Open Application No. 2004-356669 (pages 4 to 10 and FIG. 2).

However, the conventional dome type camera requires that when it is installed on a ceiling, wall, or the like of a facility, the scales of the chassis and cover be aligned with each other in advance before the cover is attached to the chassis. The cover is temporarily attached to the chassis and the installation of the dome type camera is completed; and then if a situation arises in which the orientation of the window of the cover requires to be matched to the shooting direction of the camera, the cover has to be detached from the chassis, and the scales of the chassis and cover have to be aligned with each other again. For example, if a worker has misread the scale, or if the orientation of the cover has been changed by external forces such as an earthquake and tampering, the cover has to be detached from the chassis, and the scales of the chassis and cover have to be aligned with each other again. So, readjusting the orientation of the window of the cover would require time and effort.

DISCLOSURE OF THE INVENTION

Problems to be Solved by the Invention

The invention has been made in the above-mentioned background. A purpose of the invention is to provide a dome type camera in which the orientation of the cover can be easily matched to the shooting direction of the camera after the cover has been attached.

Means for Solving the Problems

An aspect of the invention is a dome type camera, which comprises: a camera for shooting in a prescribed shooting direction; a lower case to be attached with the camera; an upper case to be attached to the lower case; and a cover to be held between the upper case and the lower case for covering the camera, where the lower case has a first engaging portion; where the cover has a second engaging portion for engaging with the first engaging portion, and has a window for maintaining a shooting field of view of the camera; where the upper case can be attached to the lower case at two steps of attachment positions which are an adjustment position and a locking position; where when the attachment position of the upper case is at the adjustment position, the first engaging portion of the lower case and the second engaging portion of the cover are incompletely engaged with each other, allowing the cover to be rotatable with respect to the lower case; and where when the attachment position of the upper case is at the locking position, the first engaging portion of the lower case and the second engaging portion of the cover are completely engaged with each other, allowing the cover to be fixed to the lower case.

There are other aspects of the invention as described below. This disclosure of the invention therefore intends to provide part of the aspects of the invention and does not intend to limit the scope of the invention described and claimed herein.

DESCRIPTION OF THE SYMBOLS

1: Dome type camera
2: Camera
3: Lower case
4: Upper case
5: Cover
6: Dome cover
7: Inner cover
9: First serration
10: First locking step portion
11: Second locking step portion
12: Two-step locking groove
13: Fixing screw
19: Window
20: Second serration
22: Resin spring portion
23: Locking rib
26: Dome locking rib

BEST MODE OF EMBODYING THE INVENTION

The invention will be described in detail below. However, the following detailed description and appended drawings are not intended to limit the invention. Rather, the scope of the invention is defined by the appended claims.

A dome type camera of the invention comprises: a camera for shooting in a prescribed shooting direction; a lower case to be attached with the camera; an upper case to be attached to the lower case; and a cover to be held between the upper case and the lower case for covering the camera, where the lower case has a first engaging portion; where the cover has a second engaging portion for engaging with the first engaging portion, and has a window for maintaining a shooting field of view of the camera; where the upper case can be attached to the lower case at two steps of attachment positions which are an adjustment position and a locking position; where when the attachment position of the upper case is at the adjustment position, the first engaging portion of the lower case and the second engaging portion of the cover are incompletely engaged with each other, allowing the cover to be rotatable with respect to the lower case; and where when the attachment position of the upper case is at the locking position, the first engaging portion of the lower case and the second engaging portion of the cover are completely engaged with each other, allowing the cover to be fixed to the lower case.

In this configuration, when the attachment position of the upper case is set at the adjustment position, the first engaging portion of the lower case and the second engaging portion of the cover are not completely engaged with each other, and the orientation of the cover can be easily adjusted by rotating the cover freely with respect to the lower case. This allows the orientation of the window of the cover to be easily matched to the shooting direction of the camera after the cover has been attached. Then, by setting the attachment position of the upper case at the locking position after the orientation of the cover has been adjusted, the first engaging portion of the lower case and the second engaging portion of the cover are completely engaged with each other, allowing the cover to be easily fixed to the lower case.

In the dome type camera of the invention, the upper case may be provided with a locking piece; the lower case may be provided with a two-step locking groove that has two locking step portions in which the locking piece is locked at two steps; when the locking piece of the upper case is locked in a first locking step portion of the two-step locking groove of the lower case, the attachment position of the upper case may be at the adjustment position; and when the locking piece of the upper case is locked in a second locking step portion of the two-step locking groove of the lower case, the attachment position of the upper case may be at the locking position.

In this configuration, when the locking piece of the upper case is locked in the first locking step portion of the lower case, the attachment position of the upper case is set at the adjustment position. That is, the first engaging portion of the lower case and the second engaging portion of the cover are not completely engaged with each other, and the orientation of the cover can be easily adjusted by rotating the cover freely with respect to the lower case. This allows the orientation of the window of the cover to be easily matched to the shooting direction of the camera after the cover has been attached. When the locking piece of the upper case is locked in the second locking step portion of the lower case after the orientation of the cover has been adjusted, the attachment position of the upper case is set at the locking position. Thus, the first engaging portion of the lower case and the second engaging portion of the cover are completely engaged with each other, allowing the cover to be easily fixed to the lower case.

In the dome type camera of the invention, the cover may be provided with an elastic portion that biases the cover toward the lower case; and when the attachment position of the upper case is at the adjustment position, the first engaging portion of the lower case and the second engaging portion of the cover may be incompletely engaged with each other by a biasing force of the elastic portion to allow the cover to be rotatable with respect to the lower case and, to prevent the cover from rotating along with the upper case when the upper case is rotated with respect to the lower case.

In this configuration, when the attachment position of the upper case is set at the adjustment position, the first engaging portion of the lower case and the second engaging portion of the cover are incompletely engaged with each other by a biasing force of the elastic portion. Consequently, when the upper case is rotated with respect to the lower case so as to change the attachment position of the upper case from the adjustment position to the locking position, the cover is prevented from rotating along with the upper case. As a result, when the attachment position of the upper case is changed from the adjustment position to the locking position, the orientation of the window of the cover adjusted in the adjustment position is prevented from being displaced from the shooting direction of the camera.

The dome type camera of the invention may have a fixing member for fixing the upper case to the lower case when the attachment position of the upper case is at the locking position.

In this configuration, the attachment position of the upper case is set at the locking position, and then the upper case is fixed to the lower case by using the fixing member. This allows the upper case to be fixed in the locking position, so that rotation of the cover is prevented. As a result, the orientation of the cover can be prevented from being changed by external forces.

In the invention, with the two steps of attachment positions, which are the adjustment position and the locking position, provided as attachment positions of the upper case with respect to the lower case, the orientation of the cover can be easily adjusted after the cover has been attached, and the work efficiency is improved in installation and adjustment works.

Now, a dome type camera of an embodiment of the invention will be described with reference to the drawings. In the embodiment, a case of a dome type surveillance camera that is installed on a wall or ceiling of a facility will be illustrated for example.

Figure 1:
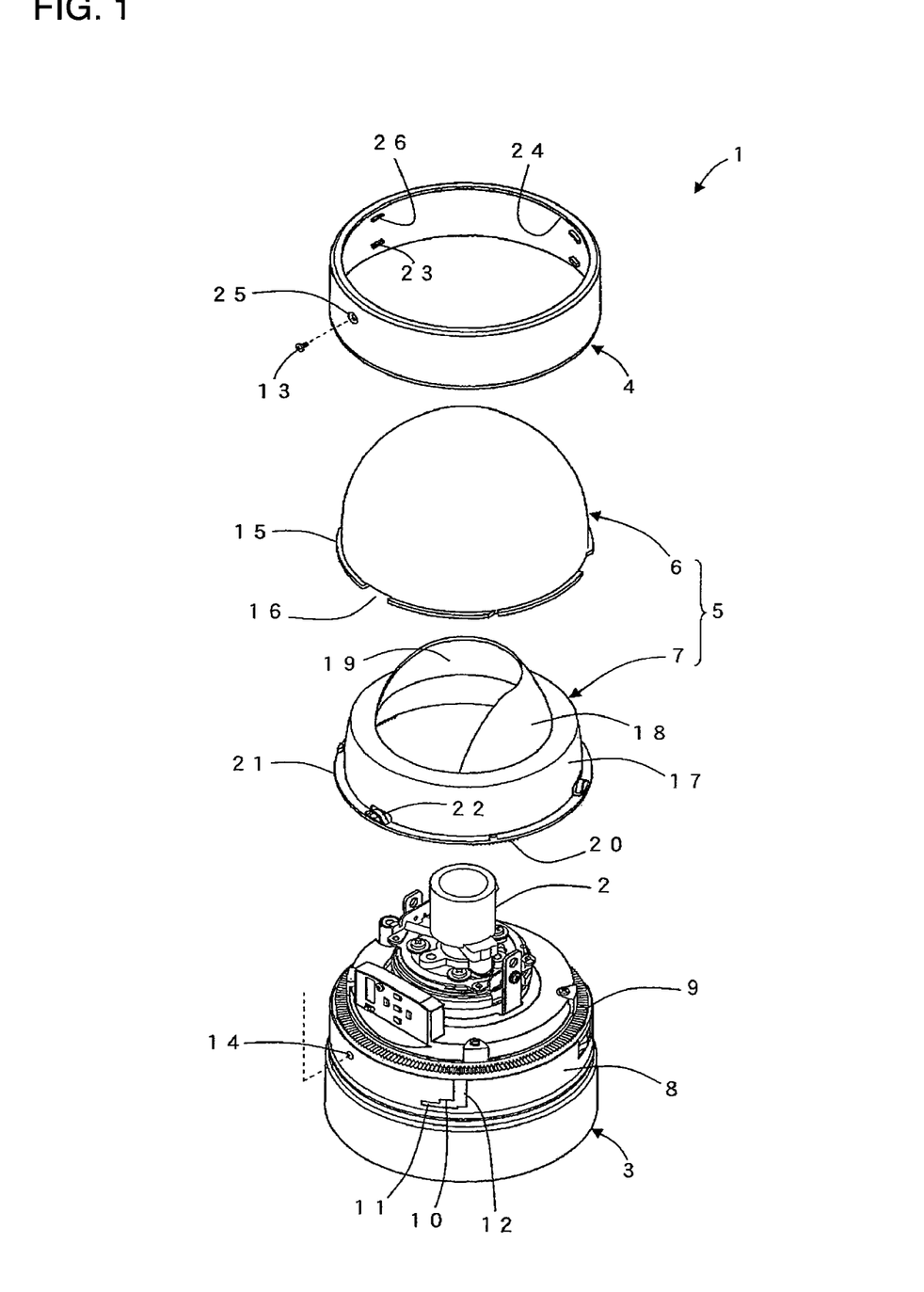
FIG. 1 is an exploded perspective view of a dome type camera of an embodiment of the invention.
Figure 2:
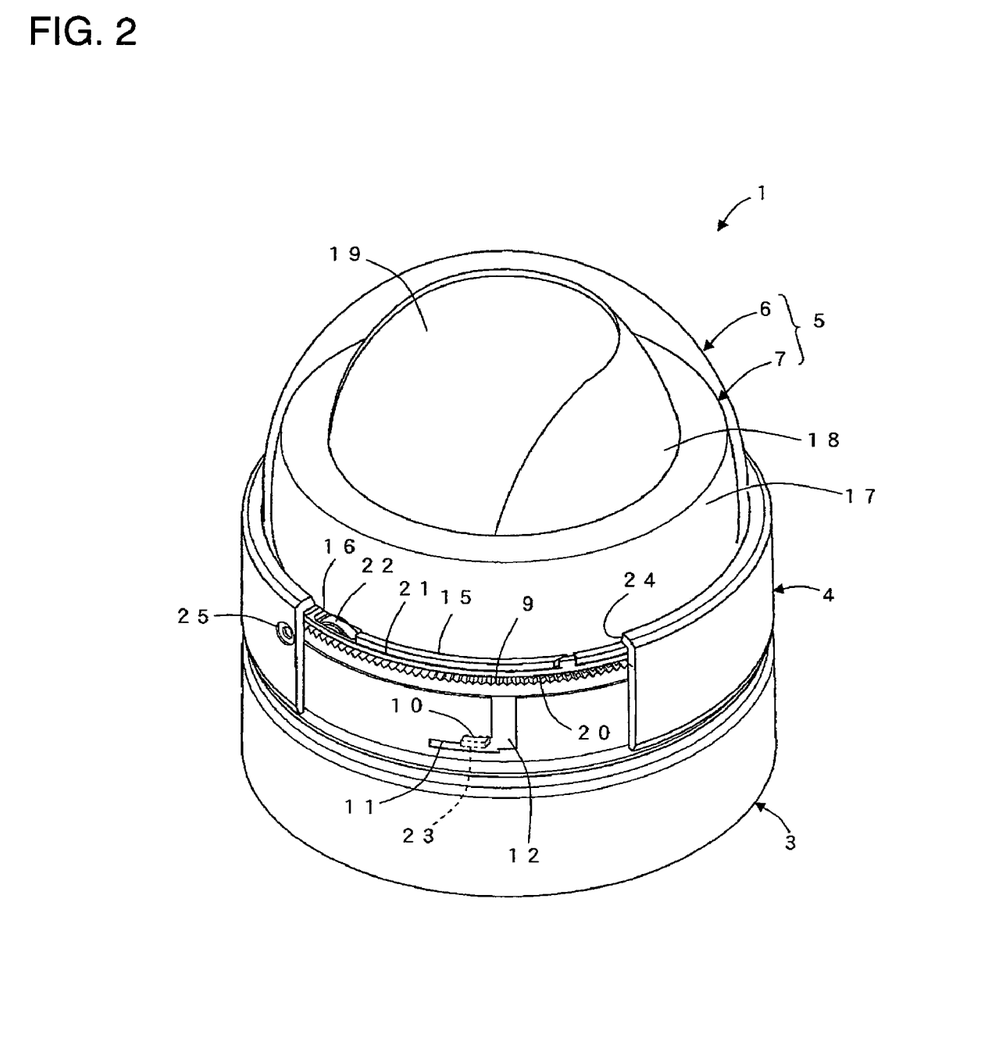
FIG. 2 is a partly cut-away perspective view of the dome type camera (adjustment position) of the embodiment of the invention.
Figure 3:
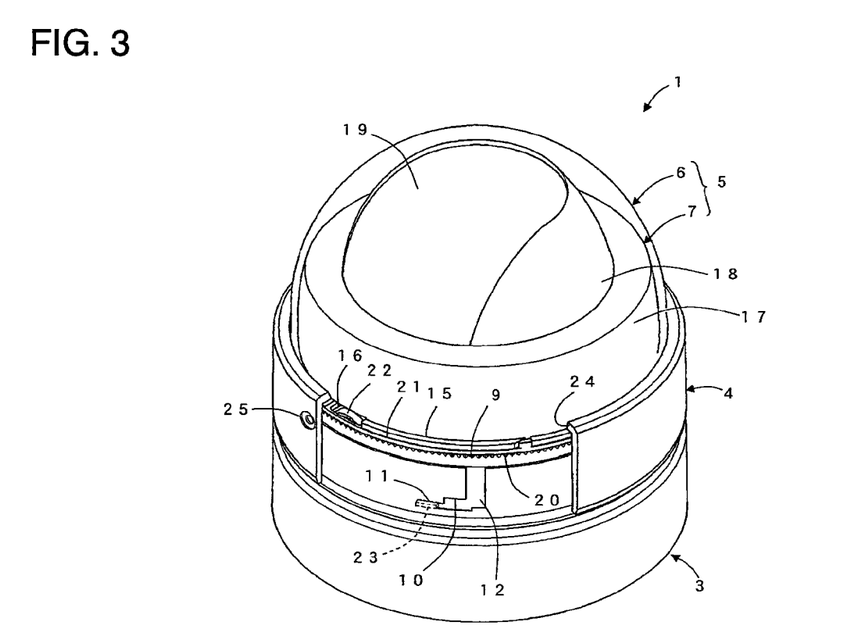
FIG. 3 is a partly cut-away perspective view of the dome type camera (locking position) of the embodiment of the invention.

FIGS. 1 to 3 shows a dome type camera of an embodiment of the invention. FIG. 1 is an exploded perspective view of the dome type camera of the embodiment. As shown in FIG. 1, the dome type camera 1 comprises: a camera 2 for shooting in a prescribed shooting direction; a lower case 3 to be attached with the camera 2; an upper case 4 to be attached to the lower case 3; and a cover 5 for covering the camera 2. In the embodiment, the cover 5 comprises a dome cover 6 made of transparent plastic, and an inner cover 7 made of opaque plastic. In the embodiment, the up/down direction will be described with reference to the orientation of the dome type camera 1 shown in FIGS. 1 to 3. However, when the dome type camera 1 is installed on a ceiling for example, the upward and downward directions will be opposite to those in the description, that is, the lower case 3 will be up and the upper case 4 will be down.

The lower case 3 has an upper/lower two-tier approximately cylindrical shape. The upper case 4 is fitted and attached to the outside of an upper half portion 8 of the lower case 3. The camera 2 is attached to the center of the upper surface of the lower case 3. A first serration 9 is provided in a ring shape on the rim of the upper surface of the lower case 3. This first serration 9 corresponds to the first engaging portion of the invention. A two-step locking groove 12 having two locking step portions 10 and 11 is formed in three places on the outer peripheral surface of the upper half portion 8 of the lower case 3. In the embodiment, the three two-step locking grooves 12 are formed at intervals of 120 degrees. The two locking step portions 10 and 11 of the two-step locking groove 12 are formed in a step-like shape, and the heights (heights in the up/down direction) of the first locking step portion 10 and second locking step portion 11 are set different from each other. A tapped hole 14 into which a fixing screw 13 is screwed is provided on the outer peripheral surface of the upper half portion 8 of the lower case 3.

The dome cover 6 is shaped like a dome. A flange 15 is provided protruding outward on the outer periphery of the lower edge of the dome cover 6. In prescribed places on the flange 15 of the dome cover 6, three cuts 16 are provided at intervals of 120 degrees.

The inner cover 7 comprises a ring-shaped base portion 17 and a cover portion 18 that is formed in the center of the base portion 17. A window 19 is provided open in the center of the cover portion 18 for maintaining a shooting field of view of the camera 2. A second serration 20 is provided in a ring shape on the rim of the undersurface of the base portion 17. This second serration corresponds to the second engaging portion of the invention. A flange 21 is provided protruding outward on the outer periphery of the lower edge of the base portion 17. In prescribed places on the flange 21 of the base portion 17, three arch-shaped resin spring portions 22 are provided at intervals of 120 degrees. The locations of the resin spring portions 22 of the inner cover 7 are set at locations corresponding to the cuts 16 of the dome cover 6.

The upper case 4 is shaped like a hollow cylinder. Three locking ribs (locking protrusions) 23 are provided protruding inward on the inner peripheral surface of the upper case 4. This locking rib (locking protrusion) 23 corresponds to the locking piece of the invention. In the embodiment, the three locking ribs 23 are provided at intervals of 120 degrees so as to correspond to the locations of the two-step locking grooves 12 of the lower case 3. A flange 24 is provided protruding inward on the inner periphery of the upper edge of the upper case 4. A screw insertion hole 25 into which the fixing screw 13 is inserted is provided on the peripheral surface of the upper case 4. Three dome locking ribs 26 are provided protruding inward on the inner peripheral surface of the upper case 4.

A description will be made of an assembly work of the dome type camera 1 configured as above.

FIGS. 2 and 3 show perspective views of the dome type camera 1 of the embodiment with the upper case 4 partly cut away. At the time of assembling the dome type camera 1 shown in FIGS. 2 and 3, the dome cover 6 is first attached onto the inner cover 7 to form the cover 5. The undersurface of the flange 15 of the dome cover 6 comes into contact with the upper surface of the flange 21 of the inner cover 7. Positioning the resin spring portions 22 of the inner cover 7 in the cuts 16 of the dome cover 6 allows each resin spring portion 22 not to touch the flange 15 of the dome cover 6 but to be exposed from each cut 16 (see FIGS. 2 and 3).

The above-described cover 5 (the dome cover 6 and the inner cover 7) is then attached to the upper case 4. The cover 5 is attached to the upper case 4 with the flange 15 of the dome cover 6 and the flange 21 of the inner cover 7 going over the dome locking ribs 26 of the upper case 4 and locked. The cover 5 can thus be prevented from easily coming off the upper case 4.

The upper case 4 attached with the above-described cover 5 (the dome cover 6 and the inner cover 7) is then attached to the lower case 3 attached with the camera 2. In the embodiment, the first serration 9 of the lower case 3 and the second serration 20 of the inner cover 7 are formed in locations corresponding to each other, and the first serration 9 and the second serration 20 are meshed and engaged with each other when the inner cover 7 is attached to the lower case 3. A shooting field of view of the camera 2 is maintained corresponding to the angle of view of the camera 2, through the window 19 of the inner cover 7.

When the above-described upper case 4 attached with the cover 5 is attached to the lower case 3, the locking ribs 23 of the upper case 4 are fitted into the two-step locking grooves 12 of the lower case 3. In the embodiment, the upper case 4 can be attached to the lower case 3 at two steps of attachment positions which are an adjustment position shown in FIG. 2 and a locking position shown in FIG. 3. In this case, the attachment position of the upper case 4 will be at the adjustment position when the upper case 4 is pushed toward the lower case 3 and then rotated forward (leftward in FIGS. 2 and 3) to lock the locking ribs 23 in the first locking step portions 10 of the two-step locking grooves 12. The attachment position of the upper case 4 will be at the locking position when the upper case 4 at the adjustment position is further pushed toward the lower case 3 and then rotated forward to lock the locking ribs 23 in the second locking step portions 11 of the two-step locking grooves 12.

As shown in FIG. 2, when the attachment position of the upper case 4 is at the adjustment position, the first serration 9 of the lower case 3 and the second serration 20 of the inner cover 7 are not completely engaged with each other, but are incompletely engaged with each other. That is, the first serration 9 of the lower case 3 and the second serration 20 of the inner cover 7 are slightly engaged with each other at their tips. In this state, the engagement force between the first serration 9 and the second serration 20 is small, and if a rotational force larger than the engagement force is applied to the inner cover 7, the inner cover 7 rotates freely with respect to the lower case 3. That is, the inner cover 7 is rotatable with respect to the lower case 3. At this time, the upper surfaces of the resin spring portions 22 of the inner cover 7 are in contact with the undersurface of the flange 24 of the upper case 4.

In the embodiment, when a rotational force larger than the engagement force is applied to the inner cover 7, the inner cover 7 rotates with respect to the lower case 3 with the threads of the second serration 20 going over the threads of the first serration 9. Each time a thread of the second serration 20 goes over one thread of the first serration 9, the thread of the second serration 20 touches and slightly engages with the next thread of the first serration 9. Consequently, the inner cover 7 is positioned with respect to the lower case 3 in a multi-step manner at each position of engagement between the first serration 9 and the second serration 20. As described above, the orientation of the inner cover 7 can thus be adjusted in a multi-step manner by rotating the inner cover 7 with respect to the lower case 3.

When the attachment position of the upper case 4 is at the adjustment position, the inner cover 7 is biased toward the lower case 3 by a spring biasing force of the resin spring portions 22 of the inner cover 7. Consequently, when the dome type camera 1 is installed on a wall, ceiling, or the like of a facility, the inner cover 7 is pushed to the lower case 3 by the spring biasing force against gravity. This allows the first serration 9 of the lower case 3 and the second serration 20 of the inner cover 7 to be slightly engaged with each other when the dome type camera 1 is installed sideways or upside down. When the attachment position of the upper case 4 is at the adjustment position, the locking ribs 23 of the upper case 4 are locked in the first locking step portions 10 of the two-step locking grooves 12 of the lower case 3, and therefore the upper case 4 is prevented from coming off the lower case 3 when the dome type camera 1 is installed sideways or upside down.

Figure 4:
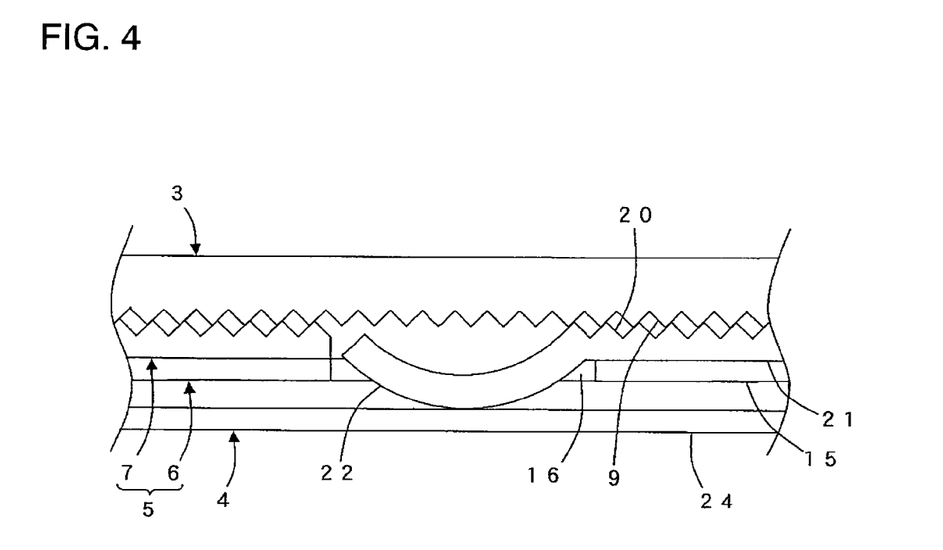
FIG. 4 is a front view for illustrating the state of spring biasing provided by a resin spring portion of the dome type camera (adjustment position) installed upside down in the embodiment of the invention.

For example, a case is illustrated in FIG. 4, in which the dome type camera 1 is installed upside down. In this state, the first serration 9 of the lower case 3 and the second serration 20 of the inner cover 7 are engaged with each other with a small engagement force by a spring biasing force of the resin spring portions 22. This engagement force is a force that prevents the inner cover 7 from rotating with respect to the lower case 3, with the first serration 9 and the second serration 20 meshing. In the case of FIG. 4, the engagement force between the first serration 9 and the second serration 20 is sufficiently larger than a rotational force that the inner cover 7 receives from the upper case 4 when the upper case 4 is rotated with respect to the lower case 3. As a result, when the upper case 4 is rotated with respect to the lower case 3, the inner cover 7 is prevented from rotating along with the upper case 4.

As shown in FIG. 3, when the attachment position of the upper case 4 is at the locking position, the first serration 9 of the lower case 3 and the second serration 20 of the inner cover 7 are completely engaged with each other. That is, the first serration 9 of the lower case 3 and the second serration 20 of the inner cover 7 are closely meshed with each other. This allows the inner cover 7 to be fixed to the lower case 3. The fixing screw 13 is then screwed through the screw insertion hole 25 into the tapped hole 14, thereby fixing the upper case 4 to the lower case 3. At this time, the undersurface of the flange 24 of the upper case 4 is in contact with the upper surface of the flange 15 of the dome cover 6. As a result, when the upper case 4 is attached to the lower case 3 as described above, the flange 15 of the dome cover 6 and the flange 21 of the inner cover 7 are put and held between the undersurface of the flange 24 of the upper case 4 and the upper surface of the lower case 3.

Now, a description will be made of an operation of performing an adjustment work for the orientation of the inner cover 7 of the above-described dome type camera 1.

When the orientation of the inner cover 7 is adjusted after installation of the dome type camera 1 of the embodiment of the invention, the fixing screw 13 is first removed to release the fixing of the upper case 4 to the lower case 3. The upper case 4 is then rotated backward (rightward in FIGS. 2 and 3) with respect to the lower case 3 to lock the locking ribs 23 of the upper case 4 in the first locking step portions 10 of the two-step locking grooves 12 of the lower case 3. That is, the attachment position of the upper case 4 is changed from the locking position to the adjustment position.

When the attachment position of the upper case 4 is at the adjustment position, the first serration 9 of the lower case 3 and the second serration 20 of the inner cover 7 are not completely engaged with each other, but are slightly and incompletely engaged with each other. In this state, the engagement force between the first serration 9 and the second serration 20 is small, and if a rotational force larger than the engagement force is applied to the inner cover 7, the inner cover 7 rotates freely with respect to the lower case 3. That is, the inner cover 7 is rotatable with respect to the lower case 3. Consequently, the inner cover 7 can be rotated with respect to the lower case 3, so that the orientation of the inner cover 7 can be matched to the shooting direction of the camera 2.

After the adjustment of the orientation of the inner cover 7 has been completed as described above, the upper case 4 is again pushed toward the lower case 3 and rotated forward to lock the locking ribs 23 of the upper case 4 in the second locking step portions 11 of the two-step locking grooves 12 of the lower case 3. That is, the attachment position of the upper case 4 is changed from the adjustment position to the locking position. In the embodiment, when the attachment position of the upper case 4 is at the adjustment position, the first serration 9 of the lower case 3 and the second serration 20 of the inner cover 7 are slightly engaged with each other. Consequently, when the upper case 4 is rotated with respect to the lower case 3 in order to change the attachment position of the upper case 4 from the adjustment position to the locking position, the inner cover 7 is prevented from rotating along with the upper case 4. Finally, the fixing screw 13 is tightened to fix the upper case 4 to the lower case 3.

In this dome type camera 1 of the embodiment of the invention, with the two steps of attachment positions, which are the adjustment position and the locking position, provided as attachment positions of the upper case 4 with respect to the lower case 3, the orientation of the inner cover 7 can be easily adjusted after the upper case 4 has been attached to the lower case 3 to attach the dome cover 6 and the inner cover 7 thereto, and the work efficiency is improved in the installation work of the dome type camera 1 and in the adjustment work of the orientation of the inner cover 7.

That is, in the embodiment, when the attachment position of the upper case 4 is set at the adjustment position, the first serration 9 of the lower case 3 and the second serration 20 of the inner cover 7 are not completely engaged with each other, and the orientation of the inner cover 7 can be easily adjusted by rotating the inner cover 7 freely with respect to the lower case 3. This allows the orientation of the window 19 of the inner cover 7 to be easily matched to the shooting direction of the camera 2 after the upper case 4 has been attached to the lower case 3 to attach the dome cover 6 and the inner cover 7 thereto. Then, by setting the attachment position of the upper case 4 at the locking position after the orientation of the inner cover 7 has been adjusted, the first serration 9 of the lower case 3 and the second serration 20 of the inner cover 7 are completely engaged with each other, allowing the inner cover to be easily fixed to the lower case 3.

For example, in the embodiment, the upper case 4 is temporarily attached to the lower case 3 to attach the dome cover 6 and the inner cover 7 thereto; and then if a situation arises in which the orientation of the window 19 of the inner cover 7 requires to be matched to the shooting direction of the camera 2, the orientation of the inner cover 7 can be easily readjusted. For example, if a worker has misread the scale, or if the orientation of the inner cover 7 has been changed by external forces such as an earthquake and tampering, the orientation of the inner cover 7 can be easily readjusted.

In the embodiment, when the locking ribs 23 of the upper case 4 are locked in the first locking step portions 10 of the lower case 3, the attachment position of the upper case 4 is set at the adjustment position. That is, the first serration 9 of the lower case 3 and the second serration 20 of the inner cover 7 are not completely engaged with each other, and the orientation of the inner cover 7 can be easily adjusted by rotating the inner cover 7 freely with respect to the lower case 3. This allows the orientation of the window 19 of the inner cover 7 to be easily matched to the shooting direction of the camera 2 after the cover 5 (the dome cover 6 and the inner cover 7) has been attached. When the locking ribs 23 of the upper case 4 are locked in the second locking step portions 11 of the lower case 3 after the orientation of the inner cover 7 has been adjusted, the attachment position of the upper case 4 is set at the locking position. Consequently, the first serration 9 of the lower case 3 and the second serration 20 of the inner cover 7 are completely engaged with each other, allowing the inner cover 7 to be easily fixed to the lower case 3.

In the embodiment, when the attachment position of the upper case 4 is set at the adjustment position, the first serration 9 of the lower case 3 and the second serration 20 of the inner cover 7 are slightly and incompletely engaged with each other by a spring biasing force of the resin spring portions 22. Consequently, when the upper case 4 is rotated with respect to the lower case 3 so as to change the attachment position of the upper case 4 from the adjustment position to the locking position, the inner cover 7 is prevented from rotating along with the upper case 4. As a result, when the attachment position of the upper case 4 is changed from the adjustment position to the locking position, the orientation of the window 19 of the inner cover 7 adjusted in the adjustment position is prevented from deviating from the shooting direction of the camera 2.

In this state, the inner cover 7 is biased toward the lower case 3 by a spring biasing force of the resin spring portions 22 of the inner cover 7. Consequently, when the dome type camera 1 is installed on a wall, ceiling, or the like of a facility, the inner cover 7 is pushed to the lower case 3 against gravity. This allows the first serration 9 of the lower case 3 and the second serration 20 of the inner cover 7 to be slightly engaged with each other as shown in FIG. 4 when the dome type camera 1 is installed sideways or upside down, and when the upper case 4 is rotated with respect to the lower case 3, the inner cover 7 is prevented from rotating along with the upper case 4.

In the embodiment, the attachment position of the upper case 4 is set at the locking position, and then the upper case 4 is fixed to the lower case 3 by using the fixing screw 13. This allows the upper case 4 to be fixed in the locking position, so that rotation of the inner cover 7 is prevented. As a result, the orientation of the inner cover 7 can be prevented from being changed by external forces, such as an earthquake and tampering.

While there has been described an embodiment of the invention with reference to illustrations, the scope of the invention is not limited thereto, and modifications and variations may be made thereto within the claimed scope according to purposes.

For example, in the above description, there has been described an example in which the lower case 3 is provided with the first serration 9 and the inner cover 7 is provided with the second serration 20 where the first serration 9 and the second serration 20 are meshed and engaged with each other, but the scope of the invention is not limited to the example. As an alternative to the above-described embodiment, the lower case 3 may be provided with a first friction part and the cover 5 is provided with a second friction part where the first and second friction parts may be engaged with each other by friction. In this case, the position of the cover 5 can be steplessly adjusted with respect to the lower case 3. In short, the engagement of the invention includes friction engagement as well as meshing engagement.

In the above description, there has also been described an example in which the upper case 4 is provided with the locking ribs 23 and the lower case 3 is provided with the two-step locking grooves 12 where the locking ribs 23 are inserted into the two-step locking grooves 12 and locked in the first or second locking step portions 10 or 11, thus allowing the adjustment and locking positions of the upper case 4 to be implemented. The scope of the invention is not limited to the example. For example, there may be a configuration in which a thread groove is provided on the inner peripheral surface of the upper case 4 and a thread portion is provided on the outer peripheral surface of the lower case 3 where the upper case 4 is screwed into the lower case 3. In this case, the attachment position of the upper case 4 is at the locking position when the upper case 4 is tightened on the lower case 3, and the attachment position of the upper case 4 is at the adjustment position when the tightening of the upper case 4 is slightly loosened.

In the above description, there has been described an example in which the flange 21 of the inner cover 7 is provided with the resin spring portions 22, but the scope of the invention is not limited to the example. The elastic portion to be provided on the cover 5 may be, for example, a rubber-made cushion part or the like as long as it has a biasing force to bias the cover 5 toward the lower case 3.

In the above description, there has been described an example in which the cover 5 comprises the two cover members, which are the dome cover 6 and the inner cover 7, but the scope of the invention is not limited to the example. The cover 5 may comprise one cover member, or three or more cover members.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As stated above, the dome type camera of the invention is used, for example, as a dome type surveillance camera and the like to be installed on a wall or ceiling of a facility, has an advantage of being able to easily adjust the orientation of the cover after the cover has been attached, and is useful as a dome type camera and the like in which the work efficiency is improved in installation and adjustment works.

The invention claimed is:

1. A dome type camera comprising: a camera for shooting in a shooting direction; a lower case to be attached with the camera; an upper case to be attached to the lower case; and a cover to be held between the upper case and the lower case for covering the camera,
wherein the cover can be rotated independently from the camera,
wherein the lower case has a first engaging portion;
wherein the cover has a second engaging portion for engaging with the first engaging portion, and has a window for maintaining a shooting field of view of the camera;
wherein the upper case can be attached to the lower case at two steps of attachment positions which are an adjustment position and a locking position;
wherein when the attachment position of the upper case is at the adjustment position, the first engaging portion of the lower case and the second engaging portion of the cover are partially engaged with each other, allowing the cover to be rotatable with respect to the lower case; and
wherein when the attachment position of the upper case is at the locking position, the first engaging portion of the lower case and the second engaging portion of the cover are completely engaged with each other, allowing the cover to be fixed to the lower case.

2. The dome type camera according to claim 1,
wherein the upper case is provided with a locking piece;
wherein the lower case is provided with a two-step locking groove that has two locking step portions in which the locking piece is locked at two steps;
wherein when the locking piece of the upper case is locked in a first locking step portion of the two-step locking groove of the lower case, the attachment position of the upper case is at the adjustment position; and wherein when the locking piece of the upper case is locked in a second locking step portion of the two-step locking groove of the lower case, the attachment position of the upper case is at the locking position.

3. The dome type camera according to claim 1, wherein the cover is provided with an elastic portion that biases the cover toward the lower case; and wherein when the attachment position of the upper case is at the adjustment position, the first engaging portion of the lower case and the second engaging portion of the cover are partially engaged with each other by a biasing force of the elastic portion, allowing the cover to be rotatable with respect to the lower case and, preventing the cover from rotating along with the upper case when the upper case is rotated with respect to the lower case.

4. The dome type camera according to claim 1, having a fixing member for fixing the upper case to the lower case when the attachment position of the upper case is at the locking position.

5. The dome type camera according to claim 1, when the attachment position of the upper case is at the adjustment position, only the tips of the first engaging portion and the second engaging portion are engaged with each other.

6. The dome type camera according to claim 1, when the attachment position of the upper case is at the adjustment position, the cover rotates with respect to the lower case by applying a rotational force larger than an engagement force between the first engaging portion and the second engaging portion.

* * * * *